United States Patent [19]

Krappatsch

[11] 4,143,265
[45] Mar. 6, 1979

[54] ARRANGEMENT FOR THE VISUAL EVALUATION OF PHOTOGRAPHIC THEMES AND FOR DETERMINING THE NECESSARY EXPOSURES

[75] Inventor: Herbert Krappatsch, Erlangen, Fed. Rep. of Germany

[73] Assignee: Gossen GmbH, Erlangen, Fed. Rep. of Germany

[21] Appl. No.: 814,442

[22] Filed: Jul. 11, 1977

[30] Foreign Application Priority Data

Sep. 24, 1976 [DE] Fed. Rep. of Germany ....... 2642975

[51] Int. Cl.$^2$ .............................................. H01J 31/50
[52] U.S. Cl. .................................. 250/213 R; 250/226
[58] Field of Search ....................... 356/218, 225, 229; 250/216, 213 VT, 237 R, 213 R, 226

[56] References Cited

U.S. PATENT DOCUMENTS

| | | | |
|---|---|---|---|
| 2,521,093 | 9/1950 | Rath | 356/225 |
| 3,652,154 | 3/1972 | Gebel | 250/213 VT |
| 3,864,037 | 2/1975 | Johnson | 250/213 VT |

Primary Examiner—David C. Nelms
Attorney, Agent, or Firm—Max Fogiel

[57] ABSTRACT

An arrangement for determining exposure parameters to obtain correct exposure of a film while photographing an object in which a lens produces a primary image of the object, which is converted into a secondary image by an electronic image converter. The converter has a contrast range and gamma value corresponding to the film. A light attenuation device influences the brightness of the primary image and has a final control element which displays the exposure parameters on a suitably calibrated scale. The image converter may have a photoactivated liquid-crystal light cell, and behind the lens may be located devices for splitting the optical path into three partial optical paths, each having an additive color extraction filter with a pass band in the red, green and blue range and an image converter. The secondary images generated by the image converters are superposed after a renewed filtering of these images by suitable additive color filters.

8 Claims, 5 Drawing Figures

ARRANGEMENT FOR THE VISUAL EVALUATION OF PHOTOGRAPHIC THEMES AND FOR DETERMINING THE NECESSARY EXPOSURES

BACKGROUND OF THE INVENTION

Correct exposure is an important criterion for successful photography. But even the use of photoelectric exposure meters or cameras with automatic exposure control does not always guarantee properly exposed films, and whether the proper values of aperture and shutter speed had been set, can be determined with certainty only with the finished end product, or on the negative. The very long waiting period sometimes involved from the time of picture taking till the result is available, can be greatly reduced by the so-called instant-photography where the finished picture can be inspected after 10 sec or after 1 minute. But even here, the result cannot be seen and evaluated instantaneously, aside from the fact that such pictures for determining the required exposure are relatively expensive.

Accordingly, it is an object of the present invention to instantly make from the theme to be photographed, a visual picture which can be looked at and evaluated and which is identical with the photographic picture produced after snapping and development, with respect to density and shadow detail of corresponding portions of the picture. Also, the exposure duration required for this photo is to be determined.

Another object of the present invention is to provide an arrangement of the foregoing character which is substantially simple in construction and may be economically fabricated.

A further object of the present invention is to provide an arrangement, as described, which may be readily maintained in service and which has a substantially long operating life.

SUMMARY OF THE INVENTION

The objects of the present invention are achieved by using an image converter tube which in itself is not the subject of the present invention.

This image converter has the same contrast range and the same gamma value as the photographic film, and differs vastly from the human eye which can see a much greater contrast. In accordance with the present invention, the photographic theme is projected by a lens on the optical input side of an image converter (primary picture). At the same time, a secondary image is produced at the image converter output; this image is similar to the photograph, e.g., on the transparency, in that it has a relatively narrow contrast range. Accordingly, this secondary image can be evaluated critically, as for example, whether all portions of the image have good shadow detail. In the primary optical path there is a light attenuation device with which the brightness of the primary image can be varied at will. For practical use, the light attenuation means is adjusted so that the secondary image of the image converter output in the normal case has good shadow detail on bright and dark portions. This is the criterion for proper evaluation of photographic film.

The resulting degree of light attenuation or the setting of the focusing device is a measure of the object brightness (medium lens luminescence) or, with a given film sensitivity, a measure of the photographic exposure (f-number and shutter speed) or for the exposure value according to American National Standard ANSI PH 3.49-1971. The device in accordance with the present invention permits determining the exposure for desired pictures, as for example, for arbitrarily overexposed or underexposed pictures.

Thus, the case of an excessive subject contrast can be mastered. If the contrast cannot be reduced by a separate illumination, one can determine with the arrangement in accordance with the present invention whether it is better to properly expose the lights or the shadows or whether a compromise between the two is to be preferred.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
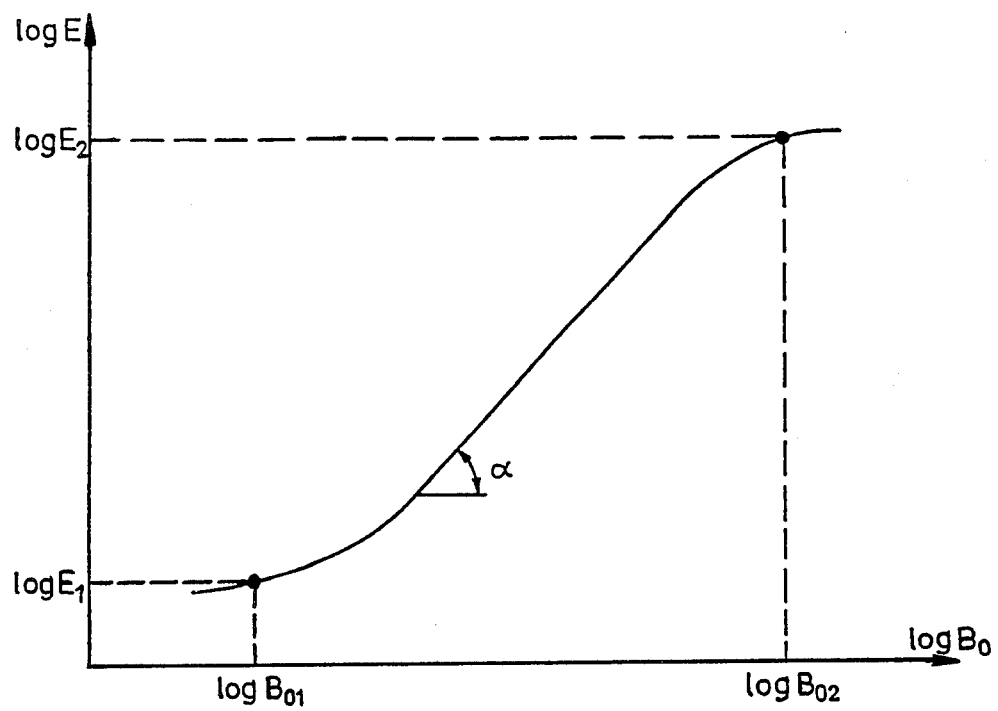
FIG. 1 explains the properties of the photographic film and of the image converter.

FIG. 1 shows a display which differs from the conventional one. Since in case of the photographic film, the film exposure can be set proportional to the luminance of the theme, and with the image converter the illumination of the primary image at the input can be set proportional to the luminance, the logarithms of the subject luminance $B_O$ were chosen for the abscissa.

Instead of the conventional densities as ordinates, logarithms of the image luminances E were used as ordinates. Thus for the film those of the projected transparency were used and for the image converter those of the secondary image were used.

The image converter, like the photographic film, both have a response threshold $B_{01}$ and a saturation limit $B_{02}$. This means that objects or part of the photographic theme with luminances below the response threshold $B_{01}$ are reproduced very darkly or without a trace. On the other hand, theme portions whose luminance is greater than that of the saturation limit $B_{02}$ are reproduced completely bright (without color) and hence without a trace. Between the limits, $B_{01}$ and $B_{02}$ is the usable range which is characterized by the ratio $B_{01}/B_{02}$, the contrast range.

Another characteristic of the curve shown in FIG. 1 is the slope of the straight portion which is equal to the tangent of the angle $\alpha : \gamma = \tan \alpha$. Instead of the angle, the concept gamma ($\gamma$) or gamma value is used.

A third characteristic of the curve, the absolute value $B_{01}$, which in the long run determines the sensitivity, is unimportant for the use of the arrangement in accordance with the present invention. However, agreement between contrast range and gamma for image converter and photographic film is important.

Figure 2:
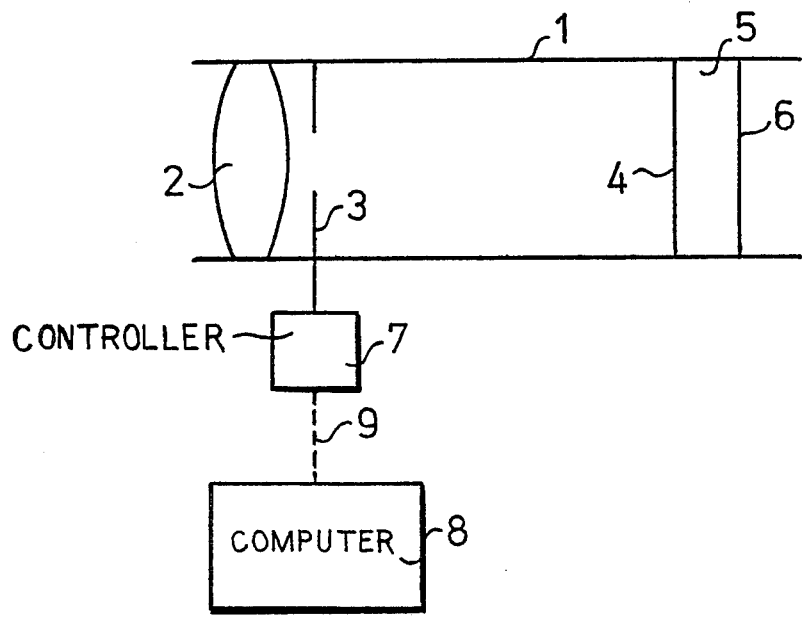
FIG. 2 shows a schematic of the device in accordance with the present invention.

FIG. 2 shows an opaque housing 1 at whose front side a lens 2 with an adjustable iris diaphragm 3 as light attenuation means is attached. The lens 2 projects the photographic theme on the input side 4 of the image converter 5 whose secondary image can be viewed and evaluated on the output side 6. The lens diaphragm 3 can be varied by the control element 7 which is connected to a computer 8 via a mechanical clutch 9. The computer 8 converts the position of control element 7 into values for f-number and shutter speed to be set on the camera, allowing for the film sensitivity (DIN number) set previously on the computer 8. Such computers, as for example, computer disks or rings 8a, are widely used on photoelectric light meters so that a detailed description here is not necessary.

Regarding the types of image converters to be used here, we should mention here the electronic image converter and image intensifier (both for visible light) and the image converter with photo-activated liquid-crystal light cell. The latter is described in the U.S. Journal IEEE Transactions on Electronic Devices 1975, page 775 cont.

If measuring is desired which is greater than can be handled by the iris diaphragm 3 of lens 2, the total attenuation range and hence the total measuring range can be expanded by a suitable neutral density filter 27.

Instead of the iris diaphragm 3, other known means, as for example, neutral wedges, may be used as light attenuation means. If necessary, the spectral sensitivity of the light-sensitive layer of the image converter can be varied by optical filters.

Figure 3:
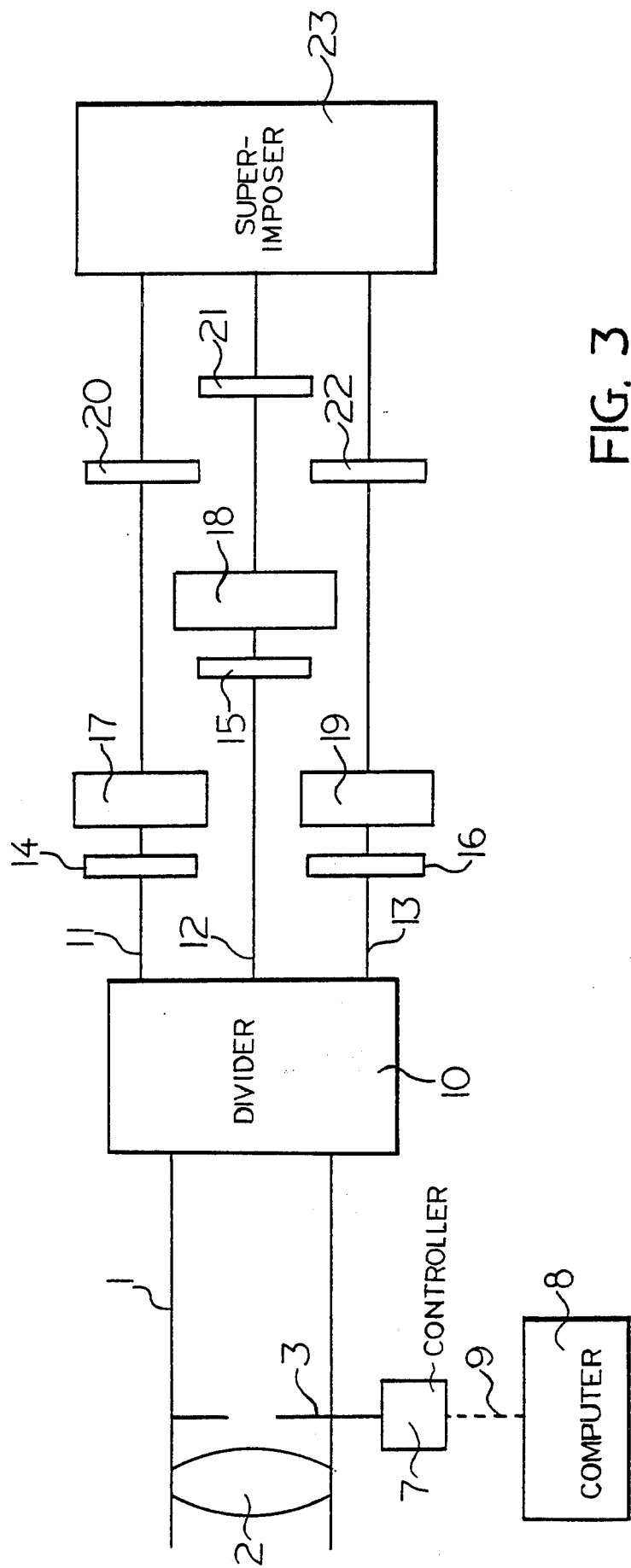
FIG. 3 is a schematic view and shows another embodiment of the arrangement of FIG. 1 for producing colored secondary images.

The image converter types mentioned produce single-color secondary images, but not colored ones. To obtain these, known methods may be used. One method uses the division into three of the optical path with partially-reflecting mirrors or interference filters by dividing element 10 shown in FIG. 3. Each of these optical paths 11, 12, 13 has a filter 14, 15, 16 which separates the blue, green or red spectral range, respectively. Each of these optical paths has its own image converter 17, 18, 19, respectively, of which one produces a blue image through a blue filter 20, a green image through a green filter 21 and a red image through a red filter 22. The three images can be superposed through known optical means 23 so that a colored picture is seen.

Figure 4:
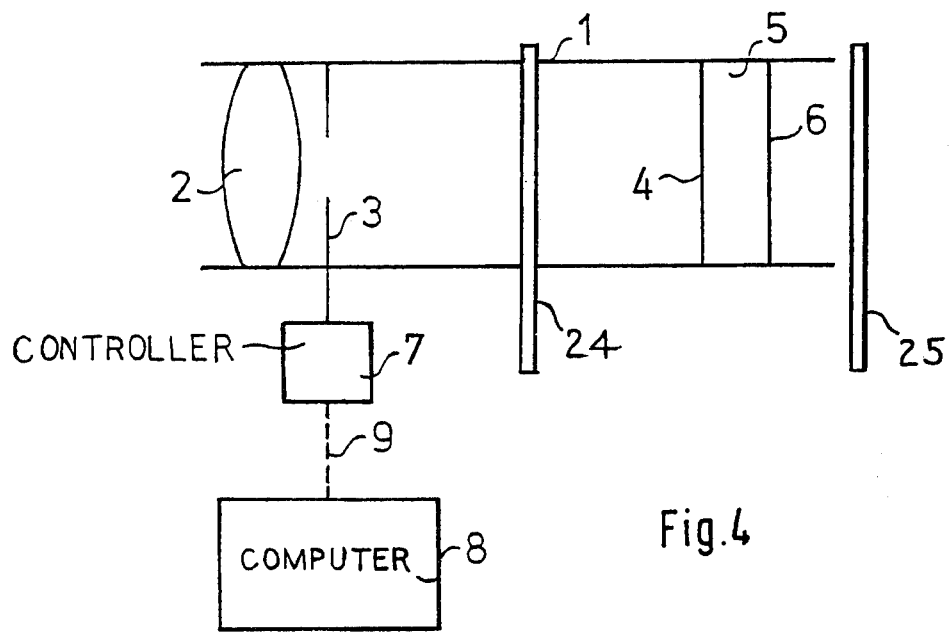
FIG. 4 is a schematic view and shows a further embodiment of the arrangement of FIG. 3.
Figure 5:
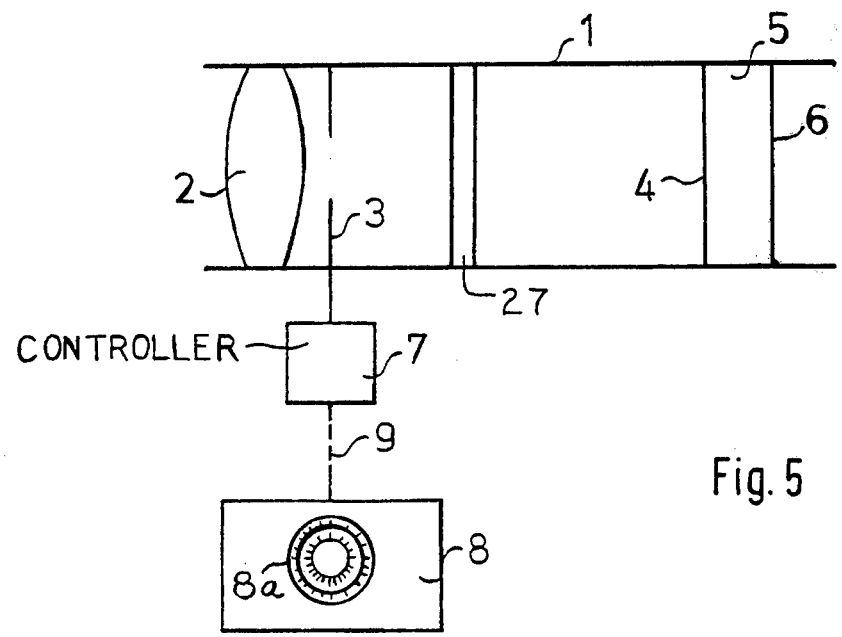
FIG. 5 is a schematic view of another embodiment of FIG. 1.

With a second method, shown in FIG. 4, the three colored images are produced successively by the same image converter 5, alternating quickly. To this end, the three filters for three-color separation are successively placed by the device 24 into the optical path of the lens 2 and synchronous with them, the same type of filters are placed by the device 25 into the optical path of the light emanating from the secondary image on the output side 6 or of this illuminating light by the synchronous drive 26.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed is:

1. An arrangement for determining exposure parameters to obtain correct exposure of a film while photographing an object, comprising: a lens producing a primary image of the object; an electronic image converter for converting the primary image into a secondary image, said converter having contrast range and gamma value corresponding to the film; and light attenuation means for influencing the brightness of the primary image and having a final control element with a calibrated scale for displaying the exposure parameters on said calibrated scale.

2. The arrangement as defined in claim 1 wherein said image converter has a photoactivated liquid-crystal light cell.

3. The arrangement as defined in claim 1 including means behind said lens for splitting the optical path into three partial optical paths, each partial optical path having an additive color extraction filter with a pass band in the red, green and blue range and having an image converter, and means for superposing secondary images generated by said image converters after renewed filtering of said secondary images by respective additive color filters.

4. The arrangement as defined in claim 1 including three additive color filters transmitting in the red, green and blue spectral range, means behind said lens for successive activation of said three additive color filters, means for illuminating or projecting the secondary image of an image converter, and means for synchronous insertion of three identical color filters into the optical path of said means for illuminating or projecting the secondary image of a converter.

5. The arrangement as defined in claim 1 including preselected neutral filters for expanding the measuring range.

6. The arrangement as defined in claim 2 including means behind said lens for splitting the optical path into three partial opticals paths, each partial optical path having an additive color extraction filter with a pass band in the red, green and blue range and having an image converter, and means for superposing secondary images generated by said image converters after renewed filtering of said images by respective additive color filters.

7. The arrangement as defined in claim 4 wherein said image converter has a photoactivated liquid-crystal light cell.

8. The arrangement as defined in claim 1 including control means for varying said light attenuation means; computer means; clutch means connecting said computer means to said control means, said computer means converting a position of said control means into values of f-number and shutter speed and allowing for film sensitivity set previously on said computer means, and neutral density filter means for expanding the total attenuation range.

* * * * *